United States Patent [19]

Kirstein

[11] Patent Number: 5,180,216
[45] Date of Patent: Jan. 19, 1993

[54] HYDRAULIC DUAL-CIRCUIT BRAKE SYSTEM WITH ANTI-SKID AND TRACTION CONTROL

[75] Inventor: Lothar Kirstein, Ditzingen, Fed. Rep. of Germany

[73] Assignee: Robert Bosch GmbH, Stuttgart, Fed. Rep. of Germany

[21] Appl. No.: 681,277

[22] Filed: Apr. 8, 1991

[30] Foreign Application Priority Data

Jun. 2, 1990 [DE] Fed. Rep. of Germany ....... 4017873

[51] Int. Cl.$^5$ ........................... B60T 8/34; B60T 13/14
[52] U.S. Cl. .................................. 303/113.2; 303/10; 303/116.1; 303/116.2
[58] Field of Search ..... 303/113 R, 113 TR, 113 AP, 303/116 R, 116 SD, 119 R, 10, 11, 110

[56] References Cited

U.S. PATENT DOCUMENTS

| 4,900,102 | 2/1990 | Jonner et al. ...................... 303/100 |
| 5,026,124 | 6/1991 | Resch .......................... 303/113 TR |

FOREIGN PATENT DOCUMENTS

| 3816073 | 11/1989 | Fed. Rep. of Germany. |
| 3900852 | 3/1990 | Fed. Rep. of Germany ...... 303/113 TR |
| 1-64663 | 6/1989 | Japan .............................. 303/116 R |
| 70562 | 3/1990 | Japan .............................. 303/113 TR |
| 2214254 | 8/1989 | United Kingdom ......... 303/113 TR |
| 2230066 | 10/1990 | United Kingdom ......... 303/113 TR |
| 2230068 | 10/1990 | United Kingdom ......... 303/113 TR |

*Primary Examiner*—Robert J. Oberleitner
*Assistant Examiner*—Alfred Muratori

[57] ABSTRACT

A hydraulic dual-circuit brake system with an anti-skid system (ABS) and traction control (ASR) for motor vehicles having a four-channel hydraulic unit with four control valves; a return pump with two separate pump elements for each brake circuit; and two-low-pressure reservoirs connected to the inlets of the pump elements. To supply brake pressure in the traction control mode, an additional hydraulic unit is used, which has a precharging pump for feeding brake fluid from a brake fluid tank into each brake circuit containing a driven wheel, and having a valve unit, which in traction control operation disconnects the pump element associated to a brake circuit having at least one driven wheel from the master brake cylinder on the outlet side. For the sake of improved dynamics during brake pressure buildup, a shutoff element, which in traction control operation disconnects the low-pressure reservoir from the precharging pump, is provided between the low-pressure reservoir and the associated pump element.

15 Claims, 4 Drawing Sheets

HYDRAULIC DUAL-CIRCUIT BRAKE SYSTEM WITH ANTI-SKID AND TRACTION CONTROL

BACKGROUND OF THE INVENTION

The invention is based on a hydraulic dual-circuit brake system with an anti-skid system (ABS) and traction control (ASR) for motor vehicles, as defined hereinafter.

In a known dual-circuit brake system of this type German Patent 38 16 073 now U.S. Pat. No. 4,900,102 having front-axle/rear-axle or front/rear brake circuit distribution, the output of the precharging pump communicates with the inlet of whichever pump element of the return pump is operative in the brake circuit of the driven wheels. The valve unit has a 3/2-way magnet valve, with three controlled valve connections, of which the first valve connection communicates with the outlet of the aforementioned pump element; the second valve connection communicates with the brake circuit outlet of the master brake cylinder associated with the brake circuit of the driven wheel; and the third valve connection communicates with the brake fluid tank, via the pressure limiting valve. The 3/2-way magnet valve is embodied such that in its basic position, the first valve connection communicates with the second valve connection, and in its reversed position brought about in traction control, it communicates with the third valve connection. In traction control, the turned-on precharging pump feeds brake fluid into the pump element of the return pump associated with the brake circuit of the driven wheels; in turn, this pump element generates the high brake pressure to apply the brake calipers and slow down the spinning driven wheel. The brake pressure required for this braking, i.e. slowing down of this wheel, is established by brake pressure modulation, as a result of switching of the control valve associated with the spinning driven wheel. Excess brake fluid is pumped back to the brake fluid tank via the pressure limiting valve. In the charging process of the pump element, the low-pressure reservoir connected to the inlet of the pump element is likewise filled, so that in the process of filling the wheel brake cylinder associated with the spinning driven wheel, a considerable volume of brake fluid is withdrawn This prolongs the filling time for the wheel brake cylinder, so that the brake calipers cannot slow down the spinning driven wheel until after an idle time, which especially with large-volume wheel brake cylinders is unacceptably long. The dynamics of the dual circuit brake system are accordingly unsatisfactory.

OBJECT AND SUMMARY OF THE INVENTION

The dual-circuit brake system according to the invention has an advantage that in traction control the low-pressure reservoir is disconnected from the inlet of the pump element of the return pump assigned to a brake circuit having at least one driven wheel and cannot be charged by the precharging pump. The entire brake fluid volume pumped by the precharging pump is then available for feeding into the pump element of the return pump. The wheel brake cylinders of the spinning driven wheels are filled substantially faster, thereby improving the dynamics of the dual-circuit brake system. The improvement can be even better if in a further embodiment of the invention the precharging pump additionally communicates via a check valve directly with the control valves associated with the particular driven wheel; the flow direction of the check valve is toward the control valves. As a result, the wheel brake cylinders of the spinning driven wheels, in traction control, are filled on the one hand directly by the precharging pump and on the other hand via the associated pump element of the return pump. Even with large-volume wheel brake cylinders, a very fast buildup of pressure in the wheel brake cylinders is thus attained.

In a preferred embodiment of the invention, the shutoff element is embodied as a 3/2-way magnet valve with spring restoration, with three controlled valve connections of which the first valve connection communicates with the low-pressure reservoir, the second valve connection communicates with the inlet of the pump element, and the third valve connection communicates with the brake fluid tank. As a result, the known communication between the control valves, the low-pressure reservoir and the return pump, via which the quantity of brake fluid flowing out of the wheel brake cylinders during brake pressure reduction flows back into the master brake cylinders, exists during the ABS mode, while in traction control the low-pressure reservoir communicating with the wheel brake cylinders of the driven wheels via the control valves is relieved directly to the brake fluid tank.

In a further embodiment of the invention, the shutoff element is embodied by a 2/2-way magnet valve with spring restoration, one valve connection of which communicates with the low-pressure reservoir, and the other valve connection of which communicates with the inlet of the return pump element associated with one brake circuit having at least one driven wheel. A second 2/2-way magnet valve with spring restoration likewise communicates with the low-pressure reservoir by one valve connection and with the brake fluid tank by its other valve connection. The first 2/2-way magnet valve is opened in its unexcited basic position; the second 2/2-way valve is blocked in its unexcited basic valve position. In traction control, both the valves are reversed, so that the low-pressure reservoir on the one hand is disconnected from the inlet of the pump element and on the other hand is relieved directly to the brake fluid tank.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
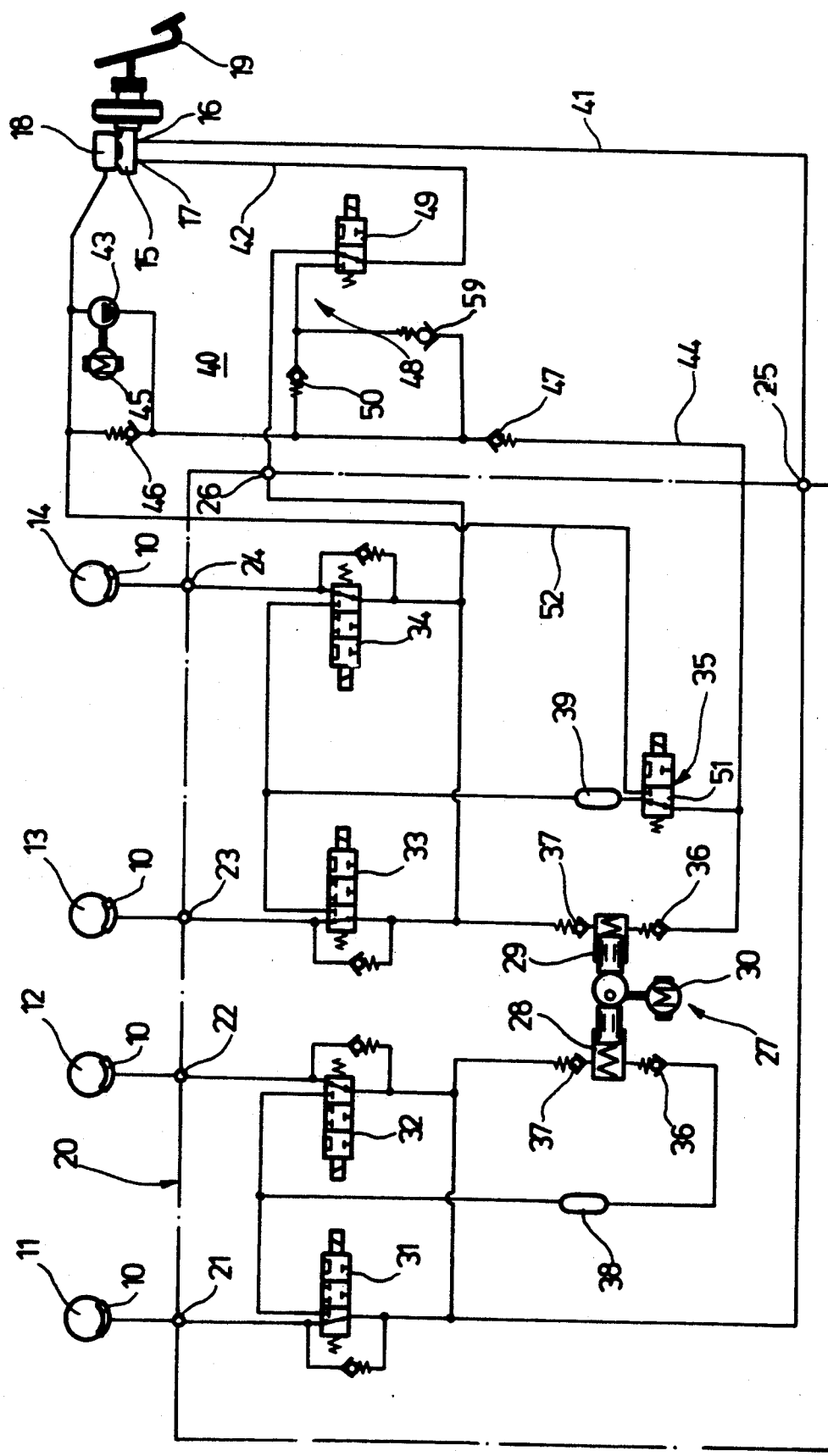
FIGS. 1 and 2 each show a block circuit diagram of a dual-circuit brake system with an anti-skid system and traction control for a passenger car, with front/rear brake circuit distribution (FIG. 1) and diagonal brake circuit distribution (FIG. 2)

In the hydraulic dual-circuit brake system for a passenger car, shown in FIG. 1 in the form of a block circuit diagram and having front/rear, or front-axle/rear-axle brake circuit distribution, an anti-skid system (ABS), and traction control (ASR), the wheel brake cylinders 10 of the nondriven wheels 11, 12 are disposed in one brake circuit, and the wheel brake cylinders 10 of the driven wheels 13, 14 are disposed in the other. The driven wheels 13, 14 are generally the rear wheels of the passenger car. In a manner known per se, the dual-circuit brake system includes a master brake cylinder 15, which has two brake circuit outlets 16, 17 each for connection to one of the two brake circuits, and which communicates with a brake fluid tank 18. Upon actuation of a brake pedal 19, a brake pressure of equal magnitude is fed into the brake circuits via the two brake circuit outlets 16, 17.

The dual-circuit brake system also includes a four-channel hydraulic unit 20, which has four outlet channels 21-24 and two inlet channels 25, 26. Each inlet channel 25 and 26, respectively, is assigned to one brake circuit and communicates with a brake circuit outlet 16 and 17, respectively, of the master brake cylinder 15 via a respective connecting line 41 and 42. One wheel brake cylinder 10 of each of the wheels 11-14 is connected to each outlet channel 21-24. One control valve 31-34, embodied as a 3/3-way magnet valve with spring restoration, is assigned to each outlet channel 21-24. The control valves 31-34 are controlled by an electronic control system, not shown here, and build up a brake pressure dependent on wheel spinning in the associated wheel brake cylinders 10. A return pump 27, which is a component of the four-channel hydraulic unit 20, has two pump elements 28, 29, which are driven in common by an electric motor 30. The pump elements 28, 29 serve to pump brake fluid upon pressure reduction in the brakes in the ABS mode. One pump element 28, 29 each is operative in each brake circuit and can be connected on the inlet side to the wheel brake cylinders 10 of the vehicle wheels 13, 14, via the two control valves 31, 32 or 33, 34 assigned to the same brake circuit, and on the outlet side is connected to an inlet channel 25 or 26 of the four-channel hydraulic unit 20. Upstream and downstream of each pump element 28, 29 are a one-way pump inlet valve 36 and a one-way pump outlet valve 37, respectively. One low-pressure reservoir each 38 and 39, respectively, is connected to the pump inlet valve 36 of the two pump elements 28, 29; a shutoff element 35, with which the communication between the low-pressure reservoir 39 and the pump element 29 can be disconnected is disposed between the low-pressure reservoir 39 and the pump inlet valve 36 of the pump element 29 associated with the brake circuit of the driven wheels 13, 14.

The control valves 31-34 are connected by their first working connection in pairs to the inlet channel 25 or 26 assigned to the first brake circuit, by their second working connection to the associated outlet channel 21-24, and by their third valve connection, in pairs, to the low-pressure reservoirs 38, 39. The control valves 31-34 are embodied in a known manner such that in their first, non-excited basic valve position there is an unhindered passage from the inlet channels 25, 26 to the outlet channels 21-24, as a result of which the brake pressure controlled by the master brake cylinder 15 reaches the wheel brake cylinders 10 of the wheels 11-14. In the second, middle valve position, which is brought about by exciting the control valves 31-34 with half the maximum current, this passage is interrupted, and all the working connections are blocked, so that the brake pressure built up in the wheel brake cylinders 10 is kept constant. In the third, terminal valve position, which is established by valve excitation with maximum current, the outlet channels 21 and 22, and 23 and 24, respectively, and thus the wheel brake cylinders 10 of the non-driven wheels 11, 12 and driven wheels 13, 14, respectively, are connected via the low-pressure chamber 38 and 39 to the inlet of the pump elements 28 and 29, respectively, so that brake fluid can flow out of the wheel brake cylinders 10, in order to be pumped back to the master brake cylinder 15 then by the pump elements 28 and 29, via the inlet channels 25, 26.

An additional hydraulic unit 40 serves to generate a brake supply pressure in traction control (in the ASR mode). It has a precharging pump 43, embodied as a low-pressure pump, which on the inlet side is connected to the brake fluid tank 18 and on the outlet side, via a feed line 44, to the pump inlet valve 36 of the pump element 29 assigned to the brake circuit of the driven wheels 13, 14. The precharging pump 43, driven by an electric motor 45, has a one-way pressure limiting valve 46 connected parallel to it, and the opening direction of the pressure limiting valve 46 is from the pump outlet toward the pump inlet. A one-way check valve 47 having a flow direction toward the pump inlet valve 36 is disposed in the feed line 44. The additional hydraulic unit 40 also includes a valve unit 48, which in traction control disconnects the master brake cylinder 15 from the brake circuit of the driven wheels 13, 14. It includes a 3/2-way magnet valve 49 with spring restoration, incorporated in the line 42 connecting the brake circuit outlet 17 of the master brake cylinder 15 to the inlet channel 26 of the four-channel hydraulic unit 20, and a pressure limiting valve 50. Of the three controlled valve connections of the 3/2-way magnet valve 49, the first valve connection communicates with the inlet channel 26 of the four-channel hydraulic unit 20; the second valve connection communicates with the brake circuit outlet 17 of the master brake cylinder 15; and the third valve connection communicates, via the pressure limiting valve 50, with the outlet of the charging pump 43 or the inlet of the pressure limiting valve 46 connected parallel to it. The first valve connection, in its unexcited basic valve connection, communicates with the second valve connection and in its reversed position brought about in traction control, it communicates with the third valve connection.

To accelerate the buildup of brake pressure in the wheel brake cylinders 10 of the driven wheels 13, 14 at the onset of traction control, a check valve 59 is additionally connected on the one hand to the third valve connection of the 3/2-way magnet valve 49 communicating with the pressure limiting valve 50, and on the other to the portion of the feed line 44 located between the precharging pump 43 and the check valve 47. The flow direction of the check valve 59 is toward the third valve connection of the 3/2-way magnet valve 49.

The shutoff element 35 is disposed between the low-pressure reservoir 39 and the pump inlet 36 of the pump element 29 is embodied as a 3/2-way magnet valve 51 with spring restoration, with three controlled valve connections of which the first communicates with the low-pressure reservoir 39, the second with the pump inlet valve 36, and the third, via a return line 52, with the brake fluid tank 18.

The two 3/2-way magnet valves 49, 51 are controlled by the electronic control system, not shown here, and then shifted to their reversed position whenever the electronic control system is informed of drive slip of at least one of the driven wheels 13, 14 by wheel slip sensors, not shown here. As it starts up, the precharging pump 43 then feeds a flow of brake fluid, via the check valve 47 and the pump inlet valve 36, into the pump element 29 associated with the brake circuit of the driven wheels 13, 14; this pump element in turn generates a high brake pressure, which via the control valves 33, 34 reaches the wheel brake cylinders 10 of the driven wheels 13, 14. As a result of the reversed 3/2-way magnet valve 51, the low-pressure reservoir 39 is disconnected from the brake fluid flow and is not filled. This means that brake fluid is not diverted to fill it, and so the filling process for the wheel brake cylinders 10 of the driven wheels 13, 14 is very much faster. At the same time, via the check valve 59, the reversed 3/2-way magnet valve 49, the inlet channel 26 of the four-channel hydraulic unit 20 and the control valve 33, 34, the precharging pump 43 feeds directly into the wheel brake cylinders 10 of the driven wheels 13, 14. This further speeds up the process of filling the wheel brake cylinders 10. Direct feeding by the precharging pump 43 is ended whenever the brake pressure generated by the pump element 29 of the return pump 27 is higher than the charging pressure of the precharging pump 43 so that the check valve 59 is blocked. The precharging pump 43 then subsequently supplies only the pump element 29.

If only one driven wheel, for instance the driven wheel 13, is spinning, then the control valve 34 of the driven wheel 14 that is not spinning is shifted to the middle valve position, and the outlet channel 24 is blocked off from the feeding of brake pressure. Via the other control valve 33, brake pressure is built up in the wheel brake cylinder 10 of the spinning driven wheel 13, which is thus slowed down. The necessary brake pressure is established by pressure modulation, which is effected by switching the control valve 33. Excess brake fluid is pumped back into the brake fluid tank 18 via the 3/2-way magnet valve 49 and the pressure limiting valves 50 and 46.

Toward the end of traction control, spinning is no longer sensed, and the electronic control system switches the control valve 33 back into its terminal valve position, which can be brought about by excitation with maximum current. In this position of the control valve 33, brake fluid flows out of the wheel brake cylinder 10 into the low-pressure reservoir 39, which via the 3/2-way magnet valve 51 is relieved directly into the brake fluid tank 18. The residual pressure remaining in the wheel brake cylinder 10 can thus be kept quite low.

Figure 2:
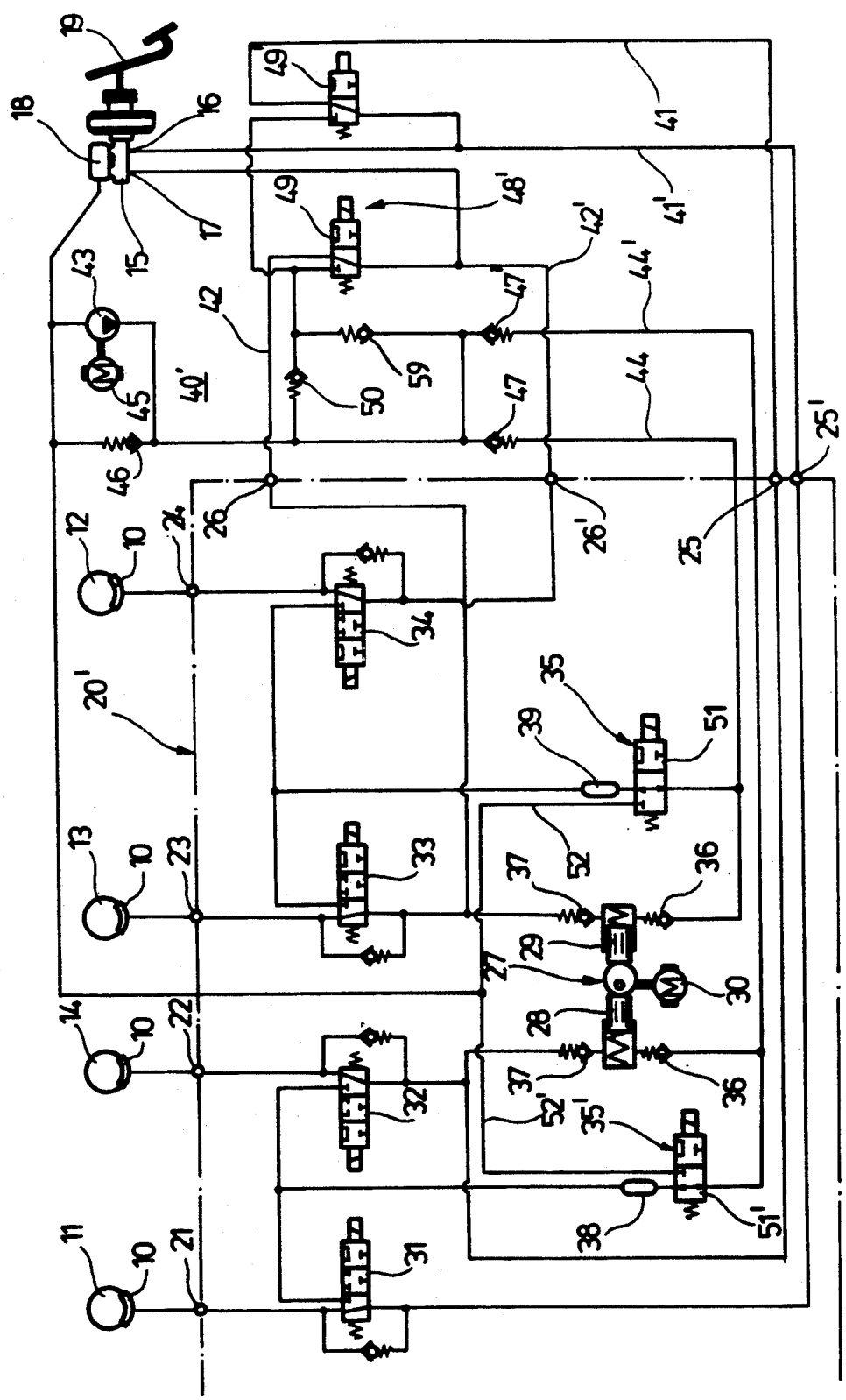

The dual-circuit brake system shown in the form of a block circuit diagram in FIG. 2 is equivalent in function and structure to the dual-circuit brake system described above, with the single difference that it is designed for diagonal brake circuit distribution. One driven wheel 13, 14 each is assigned to one of two brake circuits. Generally, the driven wheels 13, 14 are the front wheels of the passenger car. To the extent that the dual-circuit brake system matches the dual-circuit brake system described for FIG. 1, the same components are provided with the same reference numerals. There is a difference to the extent that the precharging pump 43 now communicates with one pump element 29 or 28 each via two feed lines 44, 44', each of which has a one-way check valve 47 and 47', respectively, disposed in it. Both low-pressure reservoirs 39, 38 can be blocked off from the pump inlet valve 36 by a respective shutoff element 35 and 35'. Both shutoff elements 35 and 35' are embodied as 3/2-way magnet valves 51 and 51', the third inlet of which each communicate via a respective return line 52 and 52' with the brake fluid tank 18. The four-channel hydraulic unit 40 has four inlet channels 25, 25' and 26, 26'; the inlet channels 25 and 26 are, carried to the inlet side of the control valves 33 32, each assigned to one driven wheel 13, 14, and to the pump outlet valves 37 of the pump elements 29, 28; the inlet channels 25', 26' are connected to the inlet side of the control valves 31, 34 assigned to the nondriven wheels 11, 12. The valve unit 48' has two 3/2-way magnet valves 51, 51' with spring restoration, which are each disposed in the connecting line 42, 41 from the brake circuit outlets 17, 16 of the master brake cylinder 15 to the inlet channels 26, 25. The inlet channels 25' and 26' communicate directly with the brake circuit outlets 16, 17, via connecting lines 41' and 42', respectively. The third valve connections of the 3/2-way magnet valves 49, 49' are each connected to the pressure limiting valve 50.

The mode of operation of this dual-circuit brake system with diagonal brake circuit distribution, during traction control, is the same as that described above, except that here the outlet channels 21, 24 of the control valves 31, 34 assigned to nondriven wheels 11, 12 can be reversed to their middle valve position, thus blocking off the wheel brake cylinders 10 of the nondriven wheels 11, 12 from the brake pressure supply. The 3/2-way magnet valves 49, 49' and 51, 51' are simultaneously switched over by the electronic control system upon a loss of traction.

Figure 3:
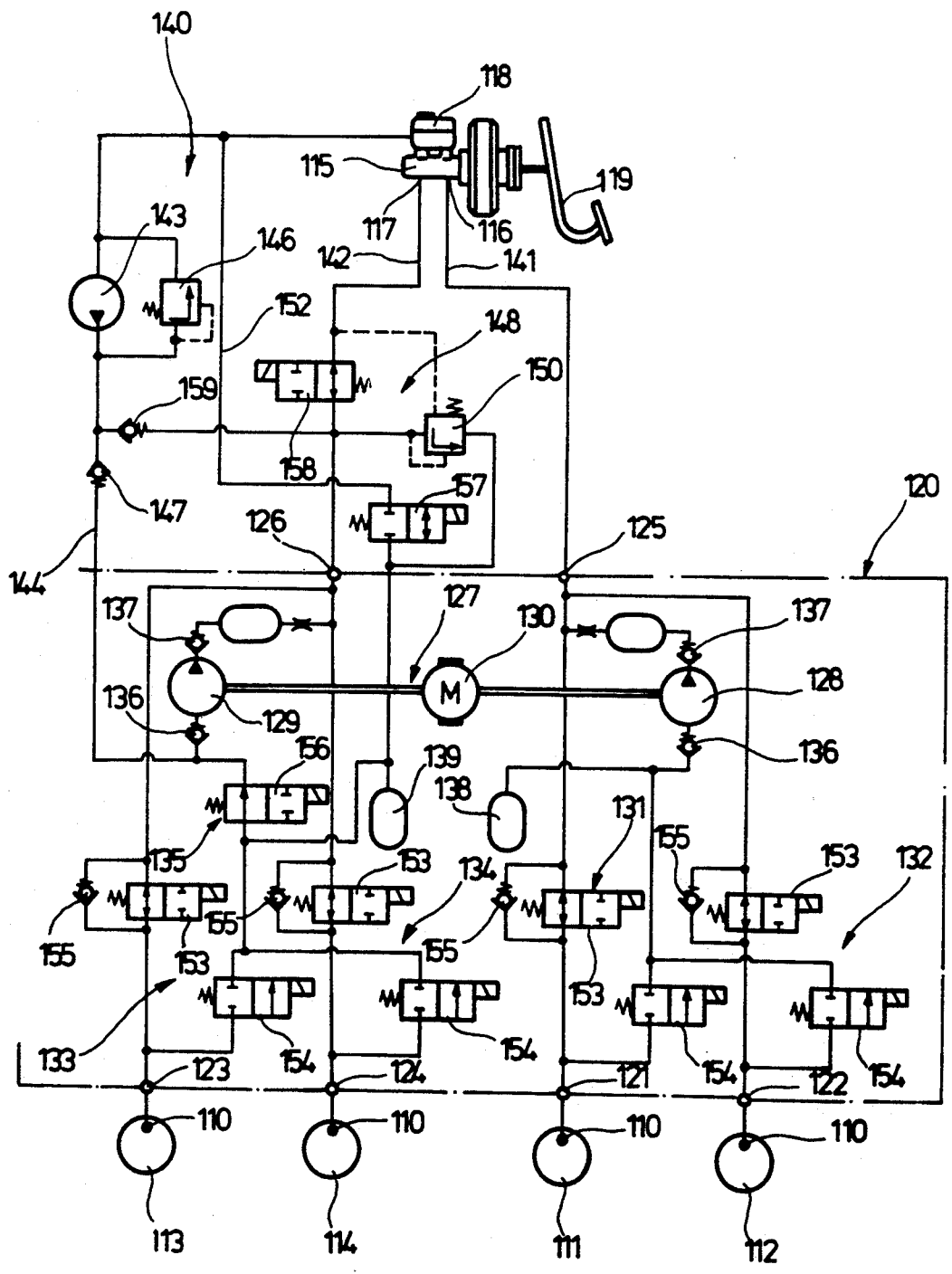
FIGS. 3 and 4 each show a block circuit diagram of a dual-circuit brake system with a anti-skid system, traction control, and front/rear brake circuit distribution, in accordance with two further exemplary embodiments.

The dual circuit brake system with front-rear brake circuit distribution, an anti-skid system, and traction control, shown in the block circuit diagram of FIG. 3, largely agrees in structure with the dual-circuit brake system shown in FIG. 1, so that the same components are identified with the same reference numerals, but raised by 100 to distinguish them.

The control valves 131–134 here each comprise a combination of an inlet valve 153 and an outlet valve 154. The inlet and outlet valves 153, 154 are embodied as 2/2-way magnet valves with spring restoration. One check valve 155 with a blocking direction toward the outlet channel 121–124 is connected parallel to each inlet valve 153. In the basic position of the inlet valves 153, there is an unhindered passage from the inlet channels 125, 126 to the outlet channels 121–124. In their working position, brought about by magnet excitation, the outlet valves 154 connect the outlet channels 121, 122 and 123, 124 to the low-pressure reservoirs 138 and 139. While the low-pressure reservoir 138 is connected directly to the pump inlet valve 136 of the pump element 128, the shutoff element 135 is again disposed between the low-pressure reservoir 139 and the pump inlet valve 136; the shutoff element 135 is embodied here as a 2/2-way magnet valve 156 with spring restoration, and in its unexcited basic position it connects the low-pressure reservoir 139 with the pump inlet valve 136, while in its reversed position brought about in traction control, it disconnects this communication. Via a return line 152, the low-pressure reservoir 139 also communicates directly with the brake fluid tank 118, in which there is a further 2/2-way magnet valve 157 with spring restoration. In its unexcited basic position, this further 2/2-way magnet valve 157 opens the return line 152, so that the low-pressure reservoir 139 is blocked off from the brake fluid tank 118, while in its reversed position brought about in traction control, it re-closes the return line 152, so that the low-pressure reservoir 139 is relieved directly into the brake fluid tank 118.

In this case, the valve unit 148 comprises a 2/2-way magnet valve 158 with spring restoration, which is disposed in the connecting line 142 from the brake circuit outlet 117 of the master brake cylinder 115 to the inlet channel 126 of the four-channel hydraulic unit 140, and the pressure limiting valve 150. In its reversed position brought about in traction control, the 2/2-way magnet valve 148 opens the connecting line 142, so that the brake circuit of the driven wheels 113, 114 is disconnected from the master brake cylinder 115. The pressure limiting valve 150 connects the inlet channel 126 to the valve connection of the 2/2-way magnet valve 157 that is connected to the low-pressure reservoir 139.

In the traction control mode, the 2/2-way magnet valves 156–158 are reversed, and the precharging pump 143 and the return pump 127 are turned on. Via the feed line 144, the precharging pump 143 supplies the pump element 129 of the return pump 127 with brake fluid, which in turn generates high brake pressure which is fed into the wheel brake cylinders 110 of the spinning driven wheels 123, 124, via the inlet valves 153, in their basic position, of the control valves 133, 134. Excess brake fluid is pumped back to the brake fluid tank 118, via the pressure limiting valve 150 and the 2/2-way magnet valve 157 in the return line 152. If only one driven wheel is spinning, then the inlet valve 153 of the control valve assigned to the nonspinning driven wheel is reversed, and thus the wheel brake cylinder 110 of the nonspinning driven wheel is blocked off from the high brake pressure generated by the pump element 129. Upon brake pressure reduction at the end of traction control, the outlet valves 154 are switched over, so that brake fluid can flow out of the wheel brake cylinders 110 of the driven wheels 113, 114 into the low-pressure reservoir 139, which in turn is relieved to the brake fluid tank 118.

To speed up the buildup of brake pressure in the wheel brake cylinders 110 of the driven wheels 113, 114 at the onset of traction control, the outlet of the precharging pump 143 is additionally made to communicate with the inlet channel 126 of the four-channel hydraulic unit 140, via a check valve 159. The flow direction of the check valve 159 is toward the inlet channel 126. In the traction control mode, the precharging pump 143 thus additionally feeds directly into the wheel brake cylinders 110 via the check valve 159 and the inlet valves 153 of the control valves 133, 134. As a result, the wheel brake cylinders 110 are filled very much faster. The direct feeding by the precharging pump 143 is ended whenever the high brake pressure generated by the pump element 129 is greater than the charge pressure of the precharging pump 143 so that the check valve 159 is blocked. After that, the precharging pump 143 then supplies only the pump element 129.

The dual-circuit brake system shown in FIG. 3 can also be used for a diagonal brake circuit distribution, if a few expansions are made. The additional components required are one further 2/2-way magnet valve 156, one further 2/2-way magnet valve 157 and one further 2/2-way magnet valve 158, which should be disposed in the same manner in the other brake circuit, which now likewise includes one of the driven wheels 113, 114. The inlet valves 153 that are associated with the nondriven wheels 111, 112 should not be connected to the inlet channels 125, 126 but rather directly to the associated brake circuit outlets 116, 117 of the master brake cylinder 115.

Figure 4:
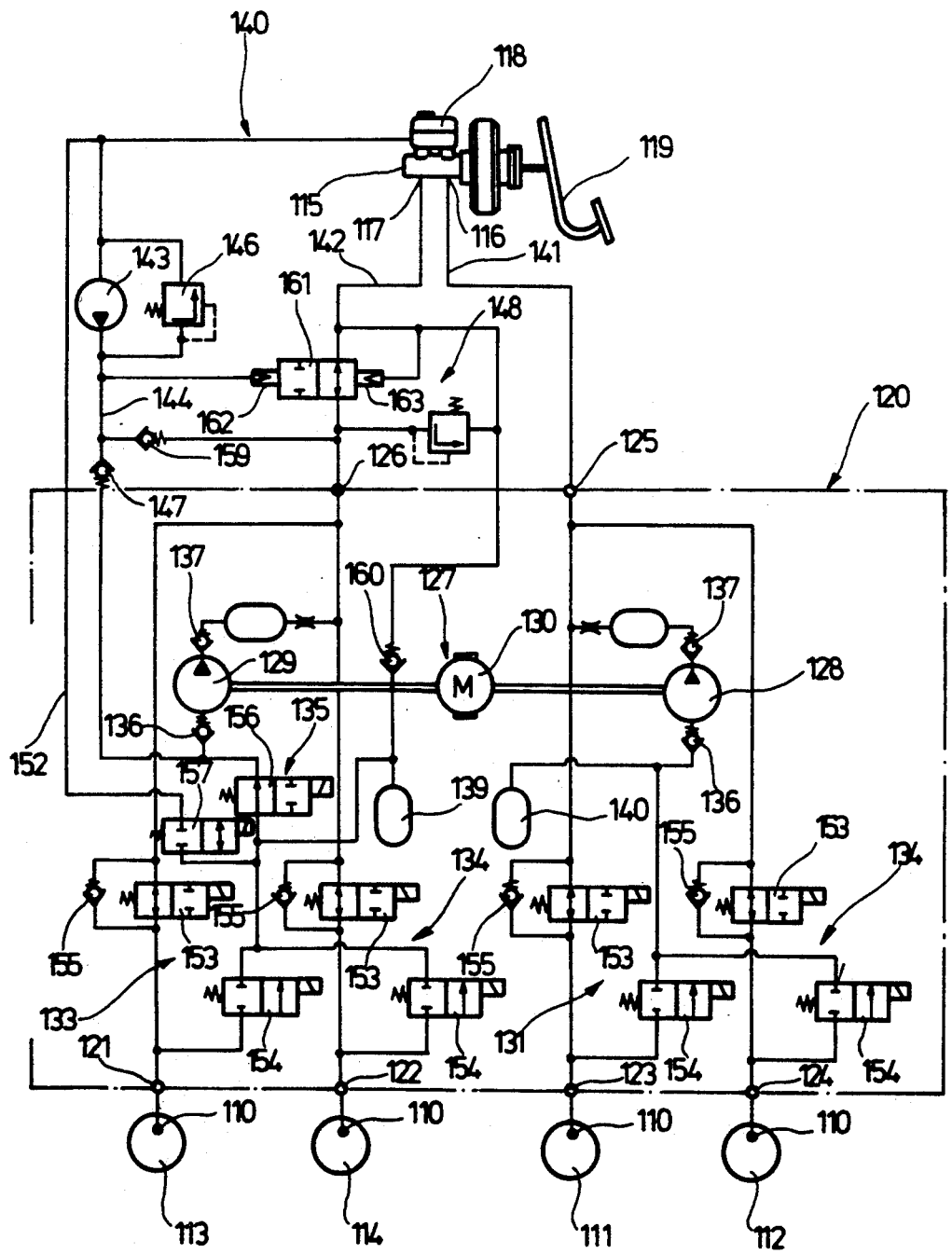

The dual-circuit brake system shown in the form of a block circuit diagram in FIG. 4 largely matches the dual-circuit brake system described for FIG. 3, except that in traction control excess brake fluid is pumped not back to the brake fluid tank 118 via the brake pressure limiting valve 150 but rather back into the master brake cylinder 115. To this end, the outlet of the pressure limiting valve 150 connected to the inlet channel 126 is made to communicate with the brake circuit outlet 117 of the master brake cylinder 115. Moreover, the low-pressure reservoir 139 in the brake circuit of the driven wheels 113, 114 is made to communicate with the brake circuit outlet 117 via a check valve 160. The flow direction of the check valve 160 is toward the master brake cylinder 115. The further valve of the valve unit 148 is not a magnet valve, but rather a hydraulically controlled 2/2-way valve 161 with two hydraulic control inlets. One control inlet 162 communicates with the outlet of the charging pump 143, and the other control inlet 163 communicates with the brake circuit outlet 117 of the master brake cylinder 115. If the precharging pump 143 is turned on in traction control operation, then the pressure it generates moves the 2/2-way valve 161 into its blocking position via the control inlet 162. Upon brake pedal actuation, the brake pressure present at the brake circuit outlet 117 moves the 2/2-way valve 161 back into its open position, via the control inlet 163.

Otherwise, the structure and mode of operation of the dual-circuit brake system is equivalent to that of FIG. 3, and so identical components are provided with the same reference numerals.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A hydraulic dual-circuit brake system for an antiskid system and traction control for motor vehicles including at least one driven vehicle wheel and a brake cylinder for each at least one driven vehicle wheel;
comprising a master brake cylinder, with first and second separate brake circuit outlets, for controlling a brake pressure by brake pedal actuation;
a brake fluid tank that communicates with the master brake cylinder;
a four-channel hydraulic unit connected to the first and second separate brake circuit outlets of the master brake cylinder, said four-channel hydraulic unit comprises:
first, second, third and fourth outlet channels, distributed to the first and second separate brake circuits, for connecting the first and second separate brake circuits to the wheel brake cylinders of the vehicle wheels,
first, second, third and fourth electromagnetic control valves each having inlets, with one each electromagnetic control valve assigned to one each of said first-fourth outlet channels, for controlling a wheel-slip-dependent brake pressure in the wheel brake cylinders, each of said electromagnetic control valves communicate with one outlet channel and in pairs via one connecting line connected with a respective brake circuit outlet to the master brake cylinder, a return pump with first and second separate pump elements, said first and second pump elements being operative in said first and second separate brake circuits, respectively, for returning brake fluid to said first and second separate brake circuits upon brake pressure reduction in the wheel brake cylinders, said first and second separate pump elements can each be made to communicate on an inlet side, via the first, second, third, and fourth control valves, with the first, second, third, and fourth outlet channels belonging to one of the first and second brake circuits, and on an outlet side of said first and second separate pump elements to communicate via an additional connecting line, with the brake circuit outlet to the master brake cylinder associated with the brake circuit under brake pressure reduction in the wheel brake cylinders, and first and second low-pressure reservoirs, each assigned to the first and second brake circuit, respectively, for temporarily holding brake fluid during brake pressure reduction, each of said first and second low-pressure reservoirs is connected to the inlet of the first and second pump element respectively;

and comprising an additional hydraulic unit for furnishing a brake supply pressure during traction control, said additional hydraulic unit has a precharging pump that communicates on an inlet side with the brake fluid tank and on an outlet side thereof, via a first check valve (46), with the inlet of the second pump element assigned to said second brake circuit having at least one drivel wheel, said precharging pump upon traction control feeds brake fluid into said third and fourth outlet channels each containing at least one driven wheel, and a valve unit (49), which upon traction control interrupts the connecting line that connects said second pump element assigned to said second brake circuit having at least one driven wheel to the master brake cylinder and connects the pump element assigned to said second brake circuit to a pressure limiting valve, and a shutoff element, which disconnects the second low-pressure reservoir from the precharging pump is operative in traction control, and is incorporated between the low-pressure reservoir, assigned to the second brake circuit having at least one driven wheel, and a connection point of the low-pressure reservoir to the second pump element of the return pump (27, 127), said shutoff element is embodied as a 3/2-way magnet valve, including first, second, and third controlled valve connections, the first controlled valve connection communicates with the second low-pressure reservoir, the second controlled valve connection communicates with the inlet of the second pump element, and the third controlled valve connection communicates with the brake fluid tank (18), and that the first valve connection in an unexcited basic valve position, communicates with the second valve connection and, in a reversed valve position, communicates with the third valve connection.

2. A brake system as defined by claim 1, in which the outlet of the precharging pump (143) additionally communicates via a second check valve (159) with the inlets of the control valves (133, 134) associated with a driven wheel (113, 114), the flow direction of the second check valve (159) being toward the control valves (133, 134).

3. A brake system as defined by claim 1, in which the valve unit (48) has at least one 3/2-way magnet valve (49, 49'), which is disposed in a connecting line between the second pump element associated with the second brake circuit having at least one driven wheel (13, 14) and the second brake circuit outlet (17, 16) of the master brake cylinder (15), said at least one pump 3/2-way magnet valve includes first, second and third valve connections the first valve connection communicates with the outlet of the second pump element, the second valve connection communicates with the second brake circuit outlet, and the third valve connection communicates via the pressure limiting valve (50) with the outlet of the precharging pump (43), to which a second pressure limiting valve (46) having an open direction toward the brake fluid tank (18) is connected in parallel, and that in traction control the 3/2-way magnet valve (49, 49') is reversed, from a valve position in which the first valve connection communicates with the second valve connection, to a valve position in which the first valve connection communicates with the third valve connection.

4. A brake system as defined by claim 3, in which a third check valve (59) having a flow direction toward the at least one 3/2-way magnet valve (49, 49') is connected to the third valve connection of the at least one 3/2-way magnet valve (49, 49') and to the outlet of the precharging pump (43).

5. A hydraulic dual-circuit brake system for an antiskid system and traction control for motor vehicles including at least one driven vehicle wheel and a brake cylinder for each at least one driven vehicle wheel;

comprising a master brake cylinder, with first and second separate brake circuit outlets, for controlling a brake pressure by brake pedal actuation;

a brake fluid tank that communicates with the master brake cylinder;

a four-channel hydraulic unit connected to the first and second separate brake circuit outlets of the master brake cylinder, said four-channel hydraulic unit comprises:

first, second, third and fourth outlet channels, distributed to the first and second separate brake circuits, for connecting the first and second separate brake circuits to the wheel brake cylinders of the vehicle wheels, first, second, third and fourth electromagnetic control valves each having inlets, with one each electromagnetic control valve assigned to one each of said first-fourth outlet channels, for controlling a wheel-slip-dependent brake pressure in the wheel brake cylinders, each of said electromagnetic control valves communicate with one outlet channel and in pairs via one connecting line connected with a respective brake circuit outlet to the master brake cylinder, a return pump with first and second separate pump elements, said first and second pump elements being operative in said first and second separate brake circuits, respectively, for returning brake fluid upon brake pressure reduction in the wheel brake cylinders, said first and second separate pump elements can each be made to communicate on an inlet side, via the first, second, third, and fourth control valves, with the first, second, third, and fourth outlet channels belonging to one of the first and second brake circuits, and on an outlet side to communicate via an additional connecting line, with the brake circuit outlet of the master brake cylinder associated with the brake circuit under brake pressure reduction in the wheel brake cylinders, and first and second low-pressure reservoirs, each assigned to the first and second brake circuit, respectively, for temporarily holding brake fluid during brake pressure reduction, each of said first and second low-pressure reservoirs is connected to the inlet of the first and second pump element respectively;

and comprising an additional hydraulic unit for furnishing a brake supply pressure during traction control, said additional hydraulic unit has a precharging pump that communicates on an inlet side with the brake fluid tank and on an outlet side thereof, via a first check valve (46), with the inlet of the second pump element assigned to said second brake circuit having at least one driven wheel, said precharging pump upon traction control feeds brake fluid into said third and fourth outlet channels containing at least one driven wheel, and a valve unit (49), which upon traction control interrupts the connecting line that connects said second pump element assigned to said second brake circuit having at least one driven wheel to the master brake cylinder and connects the pump element assigned to said second brake circuit to a pressure limiting valve, and a shutoff element, which disconnects the second low-pressure reservoir from the precharging pump is operative in traction control, and is incorporated between the low-pressure reservoir, assigned to the second brake circuit having at least one driven wheel, and a connection point of the low-pressure reservoir to the second pump element of the return pump (273, 127), said shutoff element (135) is embodied as a 2/2-way magnet valve (156) including first and second valve connections, said first valve connection communicates with the second low-pressure reservoir (139), and the second valve connection communicates with the inlet of the second pump element (129), wherein in an unexcited basic valve position, the first and second valve connections communicate with one another, and in a reversed valve position brought about in traction control the first and second connection are separated from one another, and that a second 2/2-way magnet valve (157) communicates by a first valve connection with the second low-pressure reservoir (139) and by a second valve connection with the brake fluid tank (118), wherein in an unexcited basic valve position the first and second valve connections are blocked off from one another, while in a reversed valve position brought about in traction control the first and second valve connection of said second 2/2 way magnet valve communicate with one another.

6. A brake system as defined by claim 5, in which the valve unit (148) has at least one electromagnetically or hydraulically controlled 2/2-way magnet valve (158, 161), which is disposed in a connecting line (142) between the second pump element (129) associated with the second brake circuit having at least one driven wheel (113, 114) and the second brake circuit outlet (117) of the master cylinder (115).

7. A brake system as defined by claim 6, in which the outlet of the second pump element (129) associated with the second brake circuit having at least one driven wheel (113, 114) communicates via a second pressure limiting valve (150) with the first valve connection of the second 2/2 way magnet valve (157), communicating with the second associated low-pressure reservoir (139), of the second 2/2-way magnet valve (157).

8. A brake system as defined by claim 7, in which the outlet of the precharging pump (143) additionally communicates via a second check valve (159) with the inlets of the control valves (133, 134) associated with a driven wheel (113, 114) the flow direction of the second check valve (159) being toward the control valves (133, 134).

9. A brake system as defined by claim 6, in which the outlet of the second pump element (129) associated with the second brake circuit having at least one driven wheel (113, 114) communicates via a second pressure limiting valve (150) with the second brake circuit outlet (117) of the master brake cylinder (115) associated with the second pump element (129).

10. A brake system as defined by claim 9, in which the second low-pressure reservoir (139) connected to the second pump element (129) associated with the second brake circuit having at least one driven wheel (113, 114) communicates, via a second check valve (160) having a blocking direction toward the second low-pressure reservoir (139), with the second brake circuit outlet (117) of the master brake cylinder (115).

11. A brake system as defined by claim 9, in which the outlet of the precharging pump (143) additionally communicates via a second check valve (159) with the inlets of the control valves (133, 134) associated with a driven wheel (113, 114), the flow direction of the second check valve (159) being toward the control valves (133, 134).

12. A brake system as defined by claim 6, in which the outlet of the precharging pump (143) additionally communicates via a second check valve (159) with the inlets of the control valves (133, 134) associated with a driven wheel (113, 114), the flow direction of the second check valve (159) being toward the control valves (133, 134).

13. A brake system as defined by claim 5, in which the outlet of the precharging pump (143) additionally communicates via a second check valve (159) with the inlets of the control valves (133, 134) associated with a driven wheel (113, 114), the flow direction of the second check valve (159) being toward the control valves (133, 134).

14. A hydraulic dual-circuit brake system for an antiskid system and traction control for motor vehicles including at least one driven vehicle wheel and a brake cylinder for each at least one driven vehicle wheel;

comprising a master brake cylinder, with first and second separate brake circuit outlets, for controlling a brake pressure by brake pedal actuation;

a brake fluid tank that communicates with the master brake cylinder;

a four-channel hydraulic unit connected to the first and second separate brake circuit outlets of the master brake cylinder, said four-channel hydraulic unit comprises:

first, second, third and fourth outlet channels, distributed to the first and second separate brake circuits, for connecting the first and second separate brake circuits to the wheel brake cylinders of the vehicle wheels, first, second, third and fourth electromagnetic control valves with one each electromagnetic control valve assigned to one each of said first-fourth outlet channels, for controlling a wheel-slip-dependent brake pressure in the wheel brake cylinders, each of said electromagnetic control valves communicate with one outlet channel and in pairs via one connecting line connected with a respective brake circuit outlet to the master brake cylinder, a return pump with first and second separate pump elements, said first and second pump elements being operative in said first and second separate brake circuits, respectively, for returning brake fluid upon brake pressure reduction in the wheel brake cylinders, said first and second separate pump elements can each be made to communicate on an inlet side, via the first, second, third, and fourth control valves, with the first, second, third, and fourth outlet channels belonging to one of the first and second brake circuits, and on an outlet side to communicate via an additional connecting line, with the brake circuit outlet of the master brake cylinder associated with the brake circuit under brake pressure reduction in the wheel brake cylinders, and first and second low-pressure reservoirs, each assigned to the first and second brake circuit, respectively, for temporarily holding brake fluid during brake pressure reduction, each of said first and second low-pressure reservoirs is connected to the inlet of the first and second pump element respectively;

and comprising an additional hydraulic unit for furnishing a brake supply pressure during traction control, said additional hydraulic unit has a precharging pump that communicates on an inlet side with the brake fluid tank and on an outlet side thereof, via a first check valve (46), with the inlet of the second pump element assigned to said second brake circuit having at least one driven wheel, said precharging pump upon traction control feeds brake fluid into said third and fourth outlet channels containing at least one driven wheel, and a valve unit (49), which upon traction control interrupts the connecting line that connects said second pump element assigned to said second brake circuit having at least one driven wheel to the master brake cylinder and connects the pump element assigned to said second brake circuit to a pressure limiting valve, and a shutoff element, which disconnects the second low-pressure reservoir from the precharging pump is operative in traction control, and is incorporated between the low-pressure reservoir, assigned to the second brake circuit having at least one driven wheel, and a connection point of the low-pressure reservoir to the second pump element of the return pump (27, 127), the valve unit (48) has at least one 3/2-way magnet valve (49, 49'), which is disposed in a connecting line between the second pump element associated with the second brake circuit having at least one driven wheel (13, 14) and the second brake circuit outlet (17, 16) of the master brake cylinder (15), said at least one 3/2 way magnet includes first, second and third valve connections, the first valve connection communicates with the outlet of the second pump element the second valve connection communicates with the second brake circuit outlet, and the third valve connection communicates via the pressure limiting valve (50) with the outlet of the precharging pump (43), to which a second pressure limiting valve (46) having an open direction toward the brake fluid tank (18) is connected in parallel, and that in traction control the 3/2-way magnet valve (49, 49') is reversed, from a valve position in which the first valve connection communicated with the second valve connection, to a valve position in which the first valve connection communicates with the third valve connection.

15. A brake system as defined by claim 14, in which a third check valve (59) having a flow direction toward the at least one 3/4-way magnet valve (49, 49') is connected to the third valve connection of the at least one 3/2-way magnet valve (49, 49') and to the outlet of the precharging pump (43).

* * * * *